United States Patent [19]

Christie et al.

[11] Patent Number: 4,531,946

[45] Date of Patent: Jul. 30, 1985

[54] AFTERTREATMENT OF DYED CELLULOSIC MATERIALS

[75] Inventors: Nick J. Christie, Mendham, N.J.; Randall A. Cox, Greenville, S.C.; Robert E. James, Rock Hill, S.C.; James C. Stevenson, Ft. Mill, S.C.

[73] Assignee: Diamond Shamrock Chemicals Company, Dallas, Tex.

[21] Appl. No.: 473,550

[22] Filed: Mar. 9, 1983

[51] Int. Cl.$^3$ .................. D06M 15/52; D06M 15/60; D06P 5/02

[52] U.S. Cl. .......................................... 8/192; 8/495; 8/442; 8/551; 8/552

[58] Field of Search .................. 8/192, 495, 551, 552, 8/442

[56] References Cited

U.S. PATENT DOCUMENTS 3,898,197  8/1975  Guise et al. ............................. 8/192
4,313,732  2/1982  Teague et al. .......................... 8/541
4,452,606  6/1984  van Diest ................................ 8/551

FOREIGN PATENT DOCUMENTS 50-53675    5/1975   Japan ..................................... 8/551
55-152879  11/1980   Japan ..................................... 8/551
57-61784    4/1982   Japan ..................................... 8/442
57-61772    4/1982   Japan ..................................... 8/442

Primary Examiner—Maria Parrish Tungol
Attorney, Agent, or Firm—Leslie G. Nunn, Jr.

[57] ABSTRACT

Wet and dry crocking are reduced on dyed textile cellulosic materials and their blends by aftertreatment with finish mixtures containing effective amounts of a reactive component and a blocked urethane prepolymer component. The reactive component is a polyamide, epoxidized polyamide, chain-extended polyamide, epoxidized chain extended polyamide, polyamine epoxidized polyamine or epoxidized polyalkylenimine and the blocked urethane prepolymer component is a reaction product of excess polyisocyanate and hydroxy terminated polyether or hydroxy terminated polyester whose reactive isocyanate groups are blocked. Finish mixtures are applied to the dyed textile material, dried and cured to improve wet and dry crockfastness.

7 Claims, No Drawings

AFTERTREATMENT OF DYED CELLULOSIC MATERIALS

BACKGROUND OF THE INVENTION

1. Field of the Invention

This invention relates to aftertreatment of dyed textile materials to improve dry and wet crockfastness and more particularly to aftertreatment of textile cellulosic materials and their blends dyed with disperse/naphthol, disperse/sulfur and disperse/vat dyes.

2. Description of the Prior Art

The surface nature of dyeing of cellulosic yarns and fabrics with disperse/naphthol, disperse/sulfur and disperse/vat dyes creates a fabric subject to considerable and persistent washdown or loss of color during extended use. For nearly twenty years, customers have preferred and favored casual denim garments having the so called washed down look. Often the garment or fabric was manufacturer prewashed to produce the desired "used" look. One or more chlorine bleaches were also used to create appearance of greater use.

Recently, cellulosic textile materials such as denim have been promoted as high fashion fabrics for use in suitings, slacks, dresses and the like. Some garments even carry dry clean only labels. The tide of customer and styling preference has swung to dyed garments which are more stable to washing and do not require dry cleaning to retain their original appearance.

U.S. Pat. No. 4,313,732—Teague et al, issued Feb. 2, 1982, describes a process for improving the washfastness of fabrics such as indigo dyed cellulosic fabric by aftertreating with certain halogenated triazines and quaternary ammonium compounds such as fixatives, drying and then curing the aftertreatd fabric.

SUMMARY OF THE INVENTION

Dyed textile cellulosic materials and their blends are aftertreated with a finish mixture containing effective amounts of a reactive component and a blocked urethane prepolymer component to reduce wet and dry crocking. The reactive component is a polyamide, epoxidized polyamide, chain-extended polyamide, epoxidized chain extended polyamide, polyamine, epoxidized polyamine or epoxidized polyalkylenimine. The blocked urethane prepolymer component is a reaction product of excess polyisocyanate and a hydroxy terminated polyether or hydroxy terminated polyester whose reactive isocyanate groups are blocked. The finish is applied to the dyed textile material, dried and cured to improve wet and dry crockfastness.

DETAILED DESCRIPTION

Reactive components include polyamides, epoxidized polyamides, chain extended polyamides, epoxidized chain extended polyamides, polyamines, epoxidized polyamines and epoxidized polyalkylenimines.

Useful polyamides may be prepared by reaction of polycarboxylic acids such as (a) saturated dicarboxylic acids having 4 to 12 carbon atoms;
(b) non-decarboxylating unsaturated dicarboxylic acids having from 5 to 12 carbon atoms;
(c) saturated and non-decarboxylating unsaturated tricarboxylic acids having 6 to 10 carbon atoms;
(d) $C_{1-12}$ alkyl mono- and di-esters of saturated and unsaturated dicarboxylic acids having 2 to 12 carbon atoms;
(e) $C_{1-12}$ alkyl mono- and di-esters of saturated and unsaturated tricarboxylic acids having 6 to 10 carbon atoms; and
(f) anhydrides of saturated and unsaturated dicarboxylic acids having 4 or 5 carbon atoms;

with a polyamine having at least two primary amino groups and at least one secondary or tertiary amino group such as prim, sec-diethylenetriamine; prim; sec-tetraethylenepentamine; prim, tert-bis(aminopropyl) methylamine; prim, sec-pentaethylenehexamine, prim, sec-triethylenetretramine and the like.

Specific acids, esters and anhydrides which may be used in the preparation of these polyamides include diethyloxalate, diethylmalonate, succinic acid, succinic anhydride, diethylsuccinate, monomethyl succinate, maleic anhydride, D, L-malic acid, glutaric acid, glutaric anhydride, dimethylglutarate, itaconic acid, adipic acid, monomethyl adipate and the like.

Typical polyamides prepared with the above reactants include the polyamide obtained by reaction of diethylenetriamine and adipic acid, the polyamide obtained by reaction of methyl glutarate and pentaethylenehexamethylene and the polyamide obtained by reaction of succinic acid and tetraethylene pentamine.

Disclosures as to these polyamides and their preparation as described in U.S. Pat. No. 2,926,154—Keim, dated Feb. 23, 1960, U.S. Pat. No. 2,961,347—Floyd, dated Nov. 22, 1960 and U.S. Pat. No. 3,793,279—Lipowski, dated Feb. 19, 1974 are incorporated by reference herein.

These epoxidized polyamides may be prepared by reacting one or more of the above polyamides with an epoxidizng agent such as an epihalohydrin or an alkyl substituted epihalohydrin. Typical epoxidizing agents include epichlorohydrin, epibromohydrin, epiiodohydrin, bromoepoxybutane and chloroepoxyhexane.

Useful epoxidized polyamides include an epoxidized polyamide obtained by reacting epichlorohydrin with a polyamide from adipic acid and diethylenetriamine, an epoxidized polyamide obtained by reacting dichlorohydrin with a polyamide from succinic acid and tetraethylenepentamine. Disclosures of the epoxidized polyamides in U.S. Pat. No. 2,926,154—Keim, dated Feb. 23, 1960 and U.S. Pat. No. 2,961,347—Floyd, dated Nov. 22, 1960 are incorporated by reference herein.

Epoxidized polyamides are diluted with water to desired concentration and an acid such as hydrochloric is added to reduce pH of the aqueous composition to about 1.0 to about 5.5.

Chain extended polyamides may be prepared by reacting one or more of the above polycarboxylic acids and one or more of the above polyamines at a ratio of 0.66 to about 0.99 mole of polyamine per mole of polycarboxylic acid to obtain a polyamide having free carboxylic acid groups, then reacting the polyamide with a terminating amine in an amount at least sufficient to react with all free carboxylic acid groups in the polyamide to form an amino terminated polyamide and then reacting the amino terminated polyamide with a chain extender to obtain the desired chain extended polyamide. Examples of chain extended polyamides include a chain extended polyamide formed by reaction of one mole of adipic acid with 0.95 mole of diethylenetriamine and terminated by reaction with dimethylaminopropylamine and then chain extended by reaction with 1.34 mole dichloroethyl ether per reactive amino group present in the amino terminated polyamide, a chain extended polyamide prepared by reaction of one mole of dimethyl glutarate with 0.90 mole of diethylenetriamine terminated with dimethylaminopropylamine and then chain extended with methylenedibromide, a chain extended polyamide prepared from one mole of adipic acid and 0.60 moles of pentaethylenehexmine, terminated with dimethylaminopropylamine and then chain extended with dichloroethylether. Typical chain extenders include methylenedibromide; ethylenedibromide; methylenediiodide; dichloroethylether; dichloroisopropylether; and triglycoldichloride. The disclosure as to the above chain extended polyamides and their preparation described in U.S. Pat. No. 3,793,279, dated Feb. 19, 1974 is incorporated herein by reference.

Epoxidized chain extended polyamides may be prepared by reacting one or more of the above chain extended polyamides with an epoxidizing agent such as an epihalohydrin or an alkyl substituted epihalohydrin. Typical epoxidizing agents include epichlorohydrin, epibromohydrin, epiiodohydrin, bromoepoxybutane and chloroepoxyhexane.

Useful epoxidized chain extended polyamides include an epoxidized chain extended polyamide formed by reaction of one mole of adipic acid with 0.95 mole of diethylenetriamine, terminated by reaction with dimethylaminopropylamine, chain extended by reaction with 1.34 mole dichloroethyl ether per reactive amino group present in the amino terminated polyamide and then reacted with epichlorohydrin, an epoxidized chain extended polyamine prepared by reaction of one mole of dimethyl glutarate with 0.90 mole of diethylenetriamine terminated with dimethylaminopropylamine, chain extended with methylenedibromide and then reacted with epibromohydrin, an epoxidized chain extended polyamide prepared from one mole of adipic acid and 0.60 mole of pentaethylenehexamine, terminated with dimethylaminopropylamine, chain extended with dichloroethylether and then reacted with epichlorohydrin.

The disclosure as to the above epoxidized chain extended polyamides and their preparation as described in U.S. Pat. No. 3,793,279, dated Feb. 19, 1974 is incorporated herein by reference.

The epoxidized polyamines include reaction products of polyalkyleneamines and epoxidizing agents such as a reaction product of diethylenetriamine and epichlorohydrin, a reaction product of pentaethylenehexamine and epibromohydrin, a reaction product of tetraethylene-pentamine and chloroepoxyhexane, and a reaction product of bishexamethylenetriamine and epichlorohydrin. The disclosures as to these epoxidized polyamines and their preparation described in U.S. Pat. No. 2,595,935—Daniels, Jr. et al, dated May 6, 1951 are incorporated by reference herein.

Epoxidized polyalkylenimines include the reaction products of epoxidizing agents with alkylenimine polymers such as the reaction products of epichlorohydrin with polyethylenimines having molecular weights from 50,000 to 200,000. These products also include the reaction products of the polyalkylenimine homologs of ethylenimines with epoxidizing agents such as epichlorohydrin, epibromohydrin, epiiodohydrin, bromoepoxybutane, and chloroepoxyhexane. The disclosures as to these epoxidized polyalkylenimines and their preparation as described in U.S. Pat. No. 3,520,774—Roth, dated July 14, 1970 are incorporated by reference herein.

Useful blocked urethane prepolymer emulsions may contain
(a) from about 0.35 to about 75% by weight of one or more nonvolatile urethane prepolymers having blocked isocyanate groups capable of being unblocked,
(b) from about 0.01 to about 10% by weight of nonvolatile surfactant such as nonionic surfactants, anionic surfactants and their mixtures.
(c) from 0 to about 65% by weight of one or a mixture of nonvolatile curing polyols,
(d) from 0 to about 25% by weight of one or a mixture of organic solvents free of isocyanate reactive groups, and
(e) from about 15 to about 99.64% by weight of water.

These urethane prepolymers are reaction products of hydroxy terminated polyols such as polyethers or hydroxy terminated polyesters with excess polyisocyanate which yield isocyanate terminated prepolymers. Quantities of reactants are selected to provide a ratio of isocyanate to hydroxyl groups of 2:1 to 1.1:1. Hydroxy terminated polyethers and polyesters which form the backbone of the prepolymer may be linear or branched. Hydroxy terminated polyethers have molecular weights ranging from about 50 to about 5000 while hydroxy terminated polyesters have molecular weights ranging from about 200 to about 5000.

The prepolymers are subsequently reacted with moisture, either added or absorbed from the atmosphere, or with added polyhydroxy containing compounds known as curing polyols, or with themselves by polymerization reaction to form high molecular weight, crosslinked, insoluble polyurethane polymers. Because of their reactivity with reactive hydrogen containing materials such as water and curing polyols, these prepolymers are first reacted with certain types of reactive hydrogen compounds known as blocking agents, to form addition products which are insensitive to water, curing polyols, etc. or other active hydrogen compounds at room temperature and above thereby allowing for formation of stable compositions at a temperature of up to about 150° F. Blockd prepolymers have limited thermal stability. On heating above 150° F., blocked urethane prepolymers decompose to regenerate prepolymers having reactive isocyanate (NCO) groups. Blocked prepolymers are prepared by reacting isocyanate terminated prepolymers with blocking agents using a molar ratio of reactive NCO/active hydrogen of blocking agent of 1/1 to 1/2. The blocking reaction is generally carried out at elevated temperatures reaction is generally carried out at elevated temperatures of about 50° to 125° C. and may require use of a catalyst such as a tertiary amine.

Organic solvents may be used to improve the handling characteristics of prepolymers and blocked prepolymers. These solvents include esters, ethers, etheresters, ketones, chlorinated hydrocarbons, aromatic hydrocarbons and mixtures of aromatic hydrocarbons with aliphatic hydrocarbons and other materials not containing active hydrogen atoms or other groups reactive with isocyanates. The amount of solvent depends upon the weight of the blocked prepolymer. Useful solvents include methyl ethyl ketone, methylisobutyl ketone, diisobutyl ketone, ethoxyethylacetate, xylene and the like.

Curing agents or curing polyols and their mixtures are polyhydroxy compounds that may be added to react with the unblocked prepolymer during the curing reaction. These curing agents or curing polyols are linear or branched polyhydroxy terminated polyethers or polyesters. They may include lower di and polyhydroxy organic compounds. Quantities of curing polyols used are chosen to provide an isocyanate to hydroxyl ratio of about 1/1 to about 10/1. Curing polyols are not necessary in the curing process because the unblocked prepolymer may be reacted with the moisture in the air or moisture deliberately added to the system or by self polymerization to form dimers and trimers. Curing polyols may be simple polyols such as glycols, e.g., ethylene glycol and propylene glycol as well as polyols such as glycerol, trimethylolpropane, hexanetriol, pentaerythritol or the like as well as mono-ethers such as diethylene glycol, tripropylene glycol or the like and polyethers, i.e., alkylene oxide condensates of the above. Polyesters having at least two terminal hydroxy groups may also be used as curing polyols.

To speed up the curing reaction catalysts may be added to the system. These catalysts are well known. They include tertiary amines, such as triethylamine, triethylenediamine, N-ethyl morpholine and the like, lead salts such as lead octoate, lead naphthenate and the like, tin salts such as stannous octoate.

Hydroxy terminated polyols including polyethers which are reacted with excess polyisocyanates to form isocyanate terminated prepolymers may be simple polyols such as glycols, e.g., ethylene glycol and propylene glycol as well as other polyols such as glycerol, trimethyolpropane hexanetriol, pentaerythritol, and the like as well as mono-ethers such as diethylene glycol, tripropylene glycol and the like and polyethers that are alkylene oxide condensates of the above. Alkylene oxides that may be condensed with these polyols to form polyethers include ethylene oxide, propylene oxide, butylene oxide, styrene oxide and the like. These polyethers are known as hydroxy terminated polyethers and may be linear or branched. Examples of polyethers include polyoxyethylene glycol having a molecular weight of 1540, polyoxypropylene glycol having a molecular weight of 1025, polyoxytetramethyene glycol, polyoxyhexamethylene glycol, polyoxyoctamethylene glycol, polyoxynonamethylene glycol, polyoxydecamethyelene glycol, polyoxydodecamethylene glycol and their mixtures. Other types of polyoxyalkylene glycol ethers may be used. For example polyacetals having hydroxyl groups and molecular weights of more than 200 may be prepared from an aldehyde and an alcohol such as formaldehyde and ethylene glycol. Polyethers prepared by reacting alkylene oxides with mononuclear polyhydroxybenzenes such as resorcinol, pyrogallol, phloroglucinol, hydroquinone, 4,6-t-butylcatechol, catechol, orcinol and other alkylated polyhydroxybenzenes may also be used. Polyethers prepared by reacting alkylene oxides with alkylolated hydroxybenzenes and alkyolated polyhydroxybenzenes as well as Novolaks may be used.

Hydroxy terminated polyesters and their mixtures may be used instead of or in conjunction with the hydroxy terminated polyols in preparing isocyanate terminated prepolymers including those formed by reacting organic aliphatic, cycloalphatic or aromatic di- or polycarboxylic acids, or their ester forming derivatives thereof such as anhydrides, acid halides and the like with polyols. These hydroxyl terminated polyesters must have at least two terminal hydroxyl groups. They may be prepared by transesterification. Acids useful for preparing these polyesters include maleic, azelaic, itaconic, citraconic, succinic, adipic, suberic, sebacic, o-phthalic, isophthalic, terephthalic and hexahydroterephthalic acids, their anhydrides and the alkyl unsaturated and halogen substituted derivatives of these acids as well as their homologues. Other useful acids include hydroxy acids having from 15 to 20 carbon atoms such as hydroxy palmitic acids, hydroxy stearic acids, ricinoleic acid and the like. Other dibasic acids include dimer acids such as dimerized unsaturated acids prepared from octadecadienoic acids such as 9,12-octadecadienoic acid (linoleic acid) which forms dilinoleic acids. Dilinoleic acids may be prepared by the Diels-Alder reaction. Fats and oils such as castor oil, soybean oil and the like also be used. Useful polyols for preparing these polyesters include low molecular weight polyols such as ethylene glycol, diethylene glycol, triethylene glycol, 1,4-butylene glycol, 1,3-butylene glycol, 1,6-hexanediol and their mixtures; glycerol, trimethylolethane, trimethyolpropane, 1,2,6-hexanetriol, pentaerythritol, dipentaerythritol, tripentaerythritol, polypentaerythritol, sorbitol, methyl gluosides, sucrose and the like as well as reaction products of these polyols with alkylene oxides such as ethylene oxide, propylene oxide, their mixtures and the like.

Polyisocyanates useful in preparing these prepolymers include tolylene-2,4-diisocyanate, tolylene-2,6-diisocyanate, tolylene diisocyanate (65% 2,4; 35% 2,6), tolylene diisocyanate (80%, 2,4; 20% 2,6),
1,6-hexamethylenediisocyanate (HDI),
hexamethylene diisocyanate,
1,5-naphthalenediisocyanate (NDI),
4-methoxy-1,3-phenylenediisocyanate,
4-chloro-1,3-phenylenediisocyanate,
2,4'-diisocyanatodiphenylether,
diphenyl methane-4,4'-diisocyanate (MDI),
5,6-dimethyl-1,3-phenylenediisocyanate,
2,4-dimethyl-1,3-phenylenediisocyanate,
4,6-dimethyl-1,3-phenylenediisocyanate,
4,4'-diisocyanatodibenzyl,
2,4-diiocyanatostilbene,
4,4'-diphenyl diisocyanate (XDI),
3,3'-dimethyl-4,4-diphenyl diisocyanate (TODI),
3,3'-dimethoxy-4,4'-diphenyl diisocyanate (DADI),
1,4-anthracenediisocyanate,
durylene diisocyanate,
2,4,4'-triisocyanatophenyl ether,
4,4'-methylene-bis-(cyclohexyl isocyanate) and the like.

Mixtures of polyisocyanates may also be used

Blocking agents which can be used for blocking isocyanate terminated prepolymers include phenol, ortho, meta, para cresols and their mixtures, xylenols, resorcinol, hydroquinone, catechol, guaiacol, naphthols, alkylphenols such as butylphenols, octylphenol, nonylphenol, 2,4-diisobutylphenol and the like, 4-hydroxybiphenyl, 6-hydroxytetralin, bisphenols such as isopropylidene-4,4'-bisphenol, lactams such as alphapyrrolidone, epsilon-caprolactam, oximes such as methyl ethyl ketone oxime, acetone oxime, cyclohexanone oxime, hdroxylamine, hydrogen cyanide, sodium bisulfite, tertiary butanol, diethyl malonate, ethyl acetoacetate, ethyl cyano acetate, 2,4-pentadione, acetylacetone, diphenylamine, monomethyaniline, aryl mercaptans, alkyl mercaptans, 1-phenyl-3-methyl-5-pyrazolone and the like.

Emulsification of mixtures of blocked prepolymers, which may also contain curing polyols and catalysts, may be accomplished using a surfactant or surfactant mixture as an emulsifier to form a stable oil-in-water emulsion. Without surfactants, these emulsions have very limited stability. Any surfactant may be used except one which may prematurely react with a blocked prepolymer and destroy it. The preferred surfactants are nonionic surfactants alone or in mixtures with anionic surfactants. These surfactants include polyalkylene oxide condensates of alkylated phenols, polyalkylene glycol esters of saturated and unsaturated fatty acids having from about 8 to 30 carbon atoms in the fatty acid portion, block copolymers consisting of polypropylene oxide and polyethylene oxide blocks known as Pluronics whose molecular weights may range from about 600 to about 100,000 and the Tergitol surfactants which are polyalkylene glycol ethers, having molecular weights ranging from about 1,000 to about 50,000. Spans and Tweens such as sorbitan, monooleate, sorbitan monolaurate, sorbitan monopalmitate, sorbitan monostearate, sorbitan tristearate, sorbitan trioleate, polyoxyethylene sorbitan monolaurate, polyoxyethylene sorbitan monopalmitate, polyoxyethylene sorbitan monostearate and the like may also be used as emulsifiers and dispersants. Specific examples include Span 20, Span 40, Span 60 and Span 85 and Tween 20, Tween 40, Tween 60 and Tween 80.

Anionic surfactants which may be used with the nonionic surfactants include the sodium and potassium sulfonates of alkyl benzenes and alkyl naphthalenes; sodium and potassium salts of sulfonates of naphthalenes, alkylnaphthalenes and alkyl benzenes condensed with formaldehyde; sodium and potassium sulfates of linear and branched alcohols; sodium and potassium sulfates of alkylene oxide condensates of alkylphenols; sodium and potassium sulfates of alkylene oxide condensates of alcohols; alkyl esters of sodium or potassium sulfo succinates and the like. The corresponding phosphonate and phosphate esters may be used. Amount of surfactant may range from about 0.01% to about 10% by weight of the emulsion.

Surfactants and surfactant mixtures include those having cloud points from about 5° C. to over 100° C. with the preferred cloud point range being from about 50° C. to over 100° C. The term cloud point of over 100° C. is well known in the surfactant art and means that the surfactant solution does not cloud at its boiling point.

Emulsification may be achieved by any well known method. For example, the blocked prepolymer, with or without solvent, may be added with suitable agitation to a solution or suspension of surfactant in water. Curing polyols, if used, may be dissolved or dispersed in the blocked prepolymer phase or in the aqueous phase before emulsification. Alternatively, the aqueous phase may be added to the blocked prepolymer phase. Curing polyols, if used, may be dissolved or dispersed in the blocked prepolymer phase or in the aqueous phase before emulsification. The surfactant may be dissolved or dispersed in either the aqueous phase or the blocked prepolymer phase. Preferably, the surfactant and curing polyols, if used, are dissolved or suspended in the blocked prepolymer phase and the aqueous phase then added to the mixture with suitable agitation to form the emulsion. To prepare these emulsions, mechanical equipment commonly used in emulsification such as mixers, colloid mills, homogenizers, ultrasonic mixers and the like may be used. In preparing these emulsions, temperatures between about 5° and about 50° C. may be used so long as unblocking of the prepolymer does not occur. The emulsion may contain from about 0.4% to 85% by weight of nonvolatiles, that is the blocked prepolymer, surfactant, curing polyols if any and other additives with the balance being water plus any solvent may have been used.

Stability of the emulsion system may be enhanced by the incorporation therein of 0.25 to 3 parts by weight of a colloid stabilizer per 100 parts by weight of the emulsion system. Colloid stabilizers which may be used include silicon dioxide, carboxy methyl cellulose, polymethacrylates, hydroxyethyl cellulose, methyl cellulose and Carbopol 934 which is water soluble polymer of acrylic acid crosslinked with 1% of polyallylether of sucrose averaging 5.8 allyl groups per sucrose molecule.

The disclosure as to emulsions of urethane prepolymers having blocked isocyanate groups capable of being unblocked plus curing polyols, catalysts, emulsifiers and the like described in U.S. Pat. No. 3,519,478—Howell, Jr., dated July 7, 1970, is incorporated by reference herein.

A fabric finish containing from about 1 to about 99 parts by weight of a reactive polyamine component and from about 99 to about 1 part by weight of a blocked urethane component is applied to a dyed textile fabric or material. The reactive polyamine component may be in the form of an aqueous composition containing from about 5 to about 50% by weight solids and the urethane component may be in the form of an emulsion containing from about 5 to about 70% by weight solids. A representative polyamine component contains about 63 to about 65% by weight solids while a representative urethane component contains about 33 to about 34% by weight solids.

The finish is padded on the dyed fabric, dried and cured. Padding, drying and curing may be done at any convenient temperature and residence time. After the amount of finish is applied to obtain the desired dry pickup, the treated fabric is heated to a temperature from about 150° F. to about 450° F. for sufficient time to dry and cure. During curing, blocked isocyanate groups are unblocked and the unblocked isocyanate groups are reacted with curing polyols and the polyamine component reacts on the fabric to form a polymerized water-insoluble resin and reactive groups in both components react with each other and with the surface of the dyed fabric to improve wet and dry crockfastness. The finish may also be applied by spraying, coating or any other method used in the application of finishes to dyed fabrics and other textile materials. Other additives may be incorporated in the finish such as starch, glyoxal resin, binder and/or polyvinyl alcohol to improve final characteristics of the textile materials such as hand, weight and body. The finish may also be applied before or after textile materials have been treated with these additives.

Colorfastness is resistance of a material to change in any of its color characteristics, to transfer its colorant(s) to adjacent materials, or both, as a result of exposure of the material to any environment that might be encountered during processing, testing, storing or using the material.

Crocking is a transfer of color from the surface of a colored fabric to an adjacent area of the same fabric or to another surface principally by rubbing action. Crockfastness is color fastness to rubbing (crocking). Crockfastness of dyed textile cellulosic and cellulosic blends material dyed with disperse/naphthols, disperse/sulfur disperse/vats is improved by use of a fabric finish containing one of the reactive polyamine derivatives and one of the blocked urethane components described above. Both dry and wet crocking is reduced by use of from about 0.1 to about 5% owf based on the solids content of the finish on the dyed fabric.

Crockfastness may be determined using AATCC Test Method 8-1981 entitled "Colorfastness to Crocking: AATCC Crockmeter Method". In this test, a colored test specimen fastened to the base of an AATCC Crockmeter is rubbed with white crock test cloth under controlled conditions. Color transferred to the white test cloth is estimated by a comparison with the AATCC Chromatic Transference Scale or Gray Scale for Staining.

Dyed cellulosic yarns and fabrics utilized in this invention include 100% cotton materials as well as blends with other fibers such as polyester. Dyed cellulosic textile materials such as indigo-dyed denim may be treated with this fabric finish.

For a fuller understanding of the nature and advantages of this invention, reference may be made to the following examples. These examples are given merely to illustrate the invention and are not to be construed in a limiting sense. All quantities, proportions and percentages are by weight and all reference to temperature are °C.

EXAMPLE I

(a) Preparation of an Epoxidized Polyamide

Charged 395.6 g of a polyamide derived from diethylenetriamine and a mixture of adipic and glutaric acids. The polyamide was diluted by addition of 194.7 g of water to obtain a 33.5% by weight polyamide solution. Cooled polyamide solution of 5° C. and slowly added 135.2 g of epichlorohydrin with agitation and cooling at 5° C. Stopped epichlorohydrin addition when temperature rose to 8° C. and resumed addition when temperature fell to 6° C.

After epichlorohydrin addition completed, discontinued cooling, agitated two hours while temperature was slowly raised to about 38° C. Viscosity was measured at least every 30 minutes. When viscosity reached 300 cps, viscosity was measured every 10 minutes. Reaction was terminated when viscosity reached about 500 cps.

After reaction was terminated, 189.5 g of water was immediately added with cooling and then 85.0 g of 20° Be hydrochloric acid was added with stirring. Cooled to 25° C. and stirred for 6 hours at 25° C. to obtain a 34% active solution of epoxidized polyamide having a pH of 2.

(b) Preparation of a Blocked Urethane Prepolymer and Curing Polyol Emulsion

Charged under a blanket of nitrogen and under anhydrous conditions, 157.08 g of tolylene dissocyanate containing 80% 2,4-isomer and 20% 2,6-isomer and then added over 30 minutes with mixing until homogenous and maintaining at 35° C. in the following sequence: 156.28 g of Cellosolve acetate, 1.4 g of 2,6-di-t-butyl-4-cresol, 15.01 g of trimethyolpropane, 235.12 g of polypropylene glycol (molecular weight 1025), 32.52 g of propoxylated trimethyolpropane (molecular weight 425) and 26.00 g of propoxylated trimethylolpropane (molecular weight 730). Then added 0.2 g of methyl diethanolamine, closed reactor to prevent solvent loss, heated at 50°-60° C. for one hour, then heated to 90°-95° C. and maintained at 90°-95° C. until an isocyanate terminated urethane prepolymer having 4.7% by weight reactive isocyanate groups was obtained. Cooled to 40° C.

Added to the prepolymer at 40° C., 156.28 g of xylene and 78.54 g of e-caprolactam, heated at 80°-90° C. for four hours and at 100°-105° C. for one hour until the reactive isocyanate groups in the prepolymer were blocked. Cooled to 40°-45° C.

Charged 40.22 g of propoxylated trimethylolpropane (molecular weight 300) and 101.35 g of propoxylated trimethylol propane (molecular weight 1540) to the blocked prepolymer composition to obtain a mixture of blocked prepolymer, curing polyols, solvents and additives.

Dissolved 16.8 g of 1,3,5-trimethyl-2,4,6-tri(3,5-di-t-butyl-4-hydroxybenzyl benzene) in 66.9 g of xylene at 30°-40° C., added to 916.3 g of the mixture of blocked prepolymer, curing polyols, solvent and additives and mixed until homogenous.

Prepared an emulsion by mixing 586 g of its above mixture of blocked prepolymer, curing polyols, solvents and additives, 30 g of melted Tergitol XD which is a polyalkylene glycol ether surfactant, 1 g of 6-acetoxy-2,4-dimethyl-m-dioxane until uniform and cooled to 18°-20° C. Added 50 g of water in small increments with agitation to invert the emulsion, mixed for an additional hour and added balance of 383 g of water to obtain a blocked urethane prepolymer and curing polyol emulsion.

EXAMPLE II

Preparation of a Blocked Urethane Prepolymer and Curing Polyol Emulsion

Charged under anhydrous conditions, 202.67 g of methylene bis(4-cyclohexylisocyanate), 1.53 g of 2,6-di-t-butyl-4-cresol, 12.67 g of trimethylol propane, 195.45 g polypropylene glycol (molecular weight 1025), 27.96 g propoxylated trimethylol propane (molecular weight 425), 23.36 g of propoxylated trimethylolpropane (molecular weight 730) and 151.92 g of ethylene glycol monoethyl ether acetate under nitrogen blanket, heated with agitation to 45°-50° C., agitated until homogenous and then added 0.17 g of methyl diethanolamine and 0.05 g of dibutyltin dilaurate. Closed reactor to prevent solvent loss. An exothermic reaction immediately occurred. Reacted at 85°-90° C. until an isocyanate terminated urethane prepolymer having 4.0% by weight reactive isocyanate groups was obtained. Cooled to 50° C.

Added 62.88 g of e-caprolactam and 147.08 g of xylene, added 1.02 g of methyl diethanolamine and heated at 80°-90° C. for four hours. Reacted mixture at 95°-100° C. until reactive isocyanate groups in prepolymer were blocked. Cooled to 55° C., added 0.92 g of benzoyl chloride and cooled to room temperature to obtain the caprolactam blocked urethane prepolymer.

Charged 37.56 g of propoxylated trimethyolpropane (molecular weight 425) and 50.98 g of propoxylated trimethylolpropane (molecular weight 1540) to reaction mixture and stirred until homogenous to obtain a mixture of caprolactam blocked urethane prepolymer, curing polyols, solvents and additives.

Added 16.80 g of 1,3,5-trimethyl-2,4,6-tri(3,5-di-t-butyl-4-hydroxy benzylbenzene) to 66.90 g of xylene, heated to 40° C. to dissolve and added to the reaction mixture to obtain a mixture of caprolactam blocked urethane prepolymer together with curing polyols, solvents and additive. Prepared an emulsion by mixing 586 g of the mixture of blocked prepolymer, curing polyols, solvents and additives, 30 g of melted Tergitol XD which is a polyalkylene glycol ether surfactant, 1 g of 6-acetoxy-2,4-dimethy-m-dioxane until uniform and cooled to 18°–20° C. Added 50 g of water in small increments with agitation to invert the emulsion, mixed for an additional hour and then added 333 g of water to finish the emulsion.

EXAMPLE III

The epoxidized polyamide and blocked urethane prepolymer emulsion prepared in Example I were evaluated in finish formulations to measure their crockfastness on dyed fabric.

A production lot of 65/35 polyester/cotton fabric was dyed using a dye bath containing the following sulfur dyes, disperse dyes and assistants.

| Dye or Assistant | Concentration g/l |
| --- | --- |
| Sodyesol Blue 2GBCF | 151.2 |
| Sodyesol Green 3BCF | 4.3 |
| Bucron Brown Y | 1.2 |
| Bucron Red BNS | 0.5 |
| Foron Navy Blue S-2GL | 31.3 |
| Sodified B | 45.0 |
| Antimigrant | 15.0 |

Fabric was passed through the disperse dye pad, dried in a Despatch oven at 250° F., and then heatset at 410° F. for 90 seconds in a roller curing oven. It was then passed through a chemical pad where sulfur dyes were applied and steamed at 212° F. for 45 seconds. Fabric was rinsed in a cold water bath and then oxidized in a bath containing 30 g/l Chromosalt (sodium bichromate and 5% acetic acid). It was held in the bath for 45 seconds at 140° F. and then rinsed.

One liter samples of Finish Mix Blend No. 1 through 12 were prepared to determine optimum concentrations of epoxidized polyamide and blocked urethane emulsion prepared in Example I. These blends are shown as Blend No. 1 through 12 in Table I below. These finishes also contained a glyoxal resin for creaseproofing, a nonionic surfactant for wetting and a nonionic softener for hand and magnesium choride as a catalyst for curing the glyoxal resin.

Fabric samples were individually padded through each finishing mix blend, dried at 250° F. for 60 seconds and flash cured at 410° F. for 20 seconds.

Fabric samples were then tested using AATCC test method 8-1981; Colorfastness to Crocking to determine performance of each finish mix blend. Results of these tests are shown below.

| Blend No. | Crockfastness Ratings (Class) | |
| --- | --- | --- |
|  | Dry | Wet |
| 1 | 1.0 | 1.0 |
| 2 | 2.5 | 1.0-1.5 |
| 3 | 3.5 | 2.5 |
| 4 | 2.5 | 1.5 |
| 5 | 3.0 | 2.0 |
| 6 | 3.0 | 2.0 |
| 7 | 3.0 | 2.0 |
| 8 | 4.0 | 3.5 |
| 9 | 4.5 | 3.5 |
| 10 | 3.0 | 2.0 |
| 11 | 3.0 | 2.0 |
| 12 | 3.5 | 2.5 |

Blend No. 8 and 9 showed the greatest improvement and were optimum levels for these finishes. Crockfastness was improved from 1.5–2.0 classes over the conventional finish (standard finish), Blend No. 2 and 3.0–3.5 classes over the blank finish (no finish), Blend No. 1.

TABLE I

| Component | Composition of Finish Mix Blend No. 1 Through 12 | | | | | | | | | | | |
| --- | --- | --- | --- | --- | --- | --- | --- | --- | --- | --- | --- | --- |
|  | Blend No. | | | | | | | | | | | |
|  | 1 | 2 | 3 | 4 | 5 | 6 | 7 | 8 | 9 | 10 | 11 | 12 |
|  | Concentration (g/l) | | | | | | | | | | | |
| glyoxal resin | — | 150 | 100 | 100 | 100 | — | 75 | 90 | 90 | 50 | — | 90 |
| nonionic surfactant | — | 1 | 1 | 1 | 1 | 1 | 1 | 1 | 1 | 1 | 1 | 1 |
| nonionic softener | — | 20 | 20 | 20 | 20 | 20 | 20 | 20 | — | 20 | — | 20 |
| magnesium chloride | — | 38 | 23 | 23 | 23 | — | 19 | 23 | 23 | 10 | — | 23 |
| epoxidized polyamide | — | — | 50 | — | 50 | 150 | 75 | 30 | 30 | 60 | 100 | 60 |
| blocked urethane prepolymer | — | — | 20 | 30 | — | — | — | 10 | 10 | 20 | 50 | 20 |

EXAMPLE IV (a) Preparation of a Polyamide

Charged 257.9 g of 98.5% active diethylenetriamine and 407.9 of a mixture of 99% active dimethyl esters of adipic and glutaric acid and refluxed until reflux temperature dropped to 85° C. or lower.

Methanol formed by the reaction and any water present were removed from the reaction mixture by distillation. Distillation was discontinued when the pot temperature reached 155° to 160° C. The product in the distillation pot was a polyamide derived from diethylenetriamine and a mixture of adipic and glutaric acids.

EXAMPLE V (a) Preparation of an Epoxidized Polyamine

Charged 500 g of bishexamethylene triamine, 290 g of water and 210 g of methanol to obtain a 50% by weight polyamine solution. The bishexamethylene triamine was the residue from distillation of a hexamethylene diamine preparation.

A total of 288.6 g of the 50% by weight polyamine solution was mixed with 107.7 g of water and cooled to 0° C. Charged 203.7 g of epichlorohydrin slowly with agitation at 0° to 10° C. As soon as the epichlorohydrin addition was complete, cooling was discontinued. The reaction was allowed to react exothermically for 2 hours. After the exothermic reaction subsided, the reaction mixture was slowly heated with agitation to reflux and refluxed until viscosity of a sample of the 35% active reaction product was 100 cps. As soon as this viscosity was obtained, the solution diluted with 385.0 g of water and its pH adjusted to 2.3 to obtain a 35% active solution of the epoxidized polyamine.

EXAMPLE VI

Preparation of a Blocked Urethane Prepolymer Emulsion

Charged under anhydrous conditions and a nitrogen blanket, 192.2 g of methylene bis(4-cyclohexylisocyanate), 11.8 g of trimethylol propane, 175.3 g polypropylene glycol (molecular weight 1025), 25.5 g of propoxylated trimethylol propane (molecular weight 425), 20.4 g of propoxylated trimethylol propane (molecular weight 730) and 141.6 g of ethylene glycol monoethyl ether acetate. Heated the reaction mixture with agitation to 45°–50° C., agitated until homogenous and then added 0.2 g of methyl diethanolamine and 0.1 g of dibutyltin dilaurate in the form of 10% by solutions in ethylene glycol monoethyl ether acetate. Closed reactor to prevent solvent loss. An exothermic reaction occurred immediately. The reaction mixture was reacted at 85°–90° C. until an isocyanate terminated urethane prepolymer having 4.5% by weight reactive isocyanate groups was obtained. Cooled the prepolymer to 50° C.

Added 73.4 g of e-caprolactam dissolved in 126.8 of xylene to the prepolymer, heated at 90° C. for four hours and then reacted at 100° C. until reactive isocyanate groups in prepolymer were blocked with the lactam. Cooled the blocked prepolymer to 45° C., added 85.6 g of propoxylated trimethylol propane (molecular weight 730) and stirred until uniform. Then added 15.7 g of 1,3,5-trimethyl-2,4,6-tri(3,5-di-t-butyl-4-hydroxy benzylbenzene) dissolved in 131.4 g of xylene, and then cooled to room temperature to obtain the caprolactam blocked urethane prepolymer. Prepared a mixture of 612.1 g of the blocked prepolymer, 32.5 of melted Tergitol XD which is a polyalkylene glycol ether emulsifier, 1 g of 6-acetoxy-2,4-dimethy-m-dioxane and 0.5 g of dibutyltin dilaurate as a 10% solution in ethylene glycol monoethyl ether acetate, stirred until uniform and then cooled the mixture to 20° C. Added 176.9 g of water with agitation to invert the emulsion for an additional hour, then added 176.9 g of water and stirred for an additional hour to obtain the emulsion.

A 150 g aliquot of the emulsion was distilled at about 60° C. under vacuum until 50 g of solvents and volatiles were removed to obtain an emulsion having 40% solids by weight.

EXAMPLE VII

Finish formulations were prepared and evalulated using the polyamide of Example IV, the epoxidized polyamine of Example V and the blocked urethane emulsions of Examples Ib, II and VI in the procedure described in Example III.

Finish Mix Blends No. 13 through 22 shown in Table II below were prepared and evaluated using AATCC test method 8-1981. These finish blends also contained a glyoxal resin for creaseproofing, a nonionic surfactant for wetting, a nonionic softener for hand and magnesium chloride as a catalyst for curing the glyoxal resin.

Results of these tests are as follows:

| Blend No. | Crockfastness Ratings (Class) | |
|---|---|---|
| | Dry | Wet |
| 13 | 1 | 1 |
| 14 | 2.5 | 1.5 |
| 15 | 2.5 | 2 |
| 16 | 4 | 3.5 |
| 17 | 4 | 3.5 |
| 18 | 4 | 3 |
| 19 | 2.5 | 2 |
| 20 | 4 | 3 |
| 21 | 3.5 | 3 |
| 22 | 4 | 3 |

TABLE II

Composition of Finish Mix Blend No. 13 Through 22

| Component (Example No.) | Blend No. | | | | | | | | | |
|---|---|---|---|---|---|---|---|---|---|---|
| | 13 | 14 | 15 | 16 | 17 | 18 | 19 | 20 | 21 | 22 |
| | Concentration (g/l) | | | | | | | | | |
| glyoxal resin | — | 150 | 90 | 90 | 90 | 90 | 90 | 90 | 90 | 90 |
| nonionic surfactant | — | 1 | 1 | 1 | 1 | 1 | 1 | 1 | 1 | 1 |
| nonionic softener | — | 20 | 20 | 20 | 20 | 20 | 20 | 20 | 20 | 20 |
| magnesium chloride | — | 38 | 23 | 23 | 23 | 23 | 23 | 23 | 23 | 23 |
| polyamide (IV) | — | — | 30 | 30 | 30 | 30 | | | | |
| epoxidized polyamine (V) | | | | | | | 30 | 30 | 30 | 30 |
| blocked prepolymer (Ib) | | | | 10 | | | | 10 | | |
| blocked prepolymer (II) | | | | | 10 | | | | 10 | |
| blocked prepolymer (VI) | | | | | | 10 | | | | 10 |

While the invention has been described with reference to certain specific embodiments thereof, it is understood that it is not to be so limited since alterations and changes may be made therein which are within the full intended scope of the appended claims.

What is claimed is:

1. In a process for aftertreating dyed cellulosic materials and their blends, the improvement comprising aftertreating dyed cellulosic materials and their blends with a finish in an amount sufficient to improve wet and dry crockfastness, the finish comprising effective amounts of a blocked urethane prepolymer component and a reactive component which is a polyamide by applying, drying and curing the reactive and prepolymer components in the finish in situ on the materials and blends.

2. In a process for aftertreating dyed cellulosic materials and their blends, the improvement comprising aftertreating dyed cellulosic materials and their blends with a finish in an amount sufficient to improve wet and dry crockfastness, the finish comprising effective amounts of a blocked urethane prepolymer component and a reactive component which is an epoxidized polyamide by applying, drying and curing the reactive and prepolymer components in the finish in situ on the materials and blends.

3. In a process for aftertreating dyed cellulosic materials and their blends, the improvement comprising aftertreating dyed cellulosic materials and their blends with a finish in an amount sufficient to improve wet and dry crockfastness, the finish comprising effective amounts of a blocked urethane prepolymer component and a reactive component selected from the group consisting of:
   (1) polyamide,
   (2) epoxidized polyamide,
   (3) chain extended polyamide,
   (4) epoxidized chain extended polyamide, and
   (5) epoxidized polyalkylenimine by applying, drying and curing the reactive and prepolymer components in the finish in situ on the materials and blends.

4. The process of claim 3 wherein a resin for creaseproofing, a surfactant for wetting and a softener for hand are present in the finish.

5. The process of claim 3 wherein the blocked urethane prepolymer component is a blocked urethane prepolymer emulsion.

6. The process of claim 3 wherein from about 0.1% to about 5.0% solids owf of finish is applied.

7. The process of claim 3 wherein the composition of the blocked urethane prepolymer component is:

(a) from about 0.35 to about 75% by weight of at least one nonvolatile urethane prepolymer having blocked isocyanate groups capable of being unblocked, (b) from about 0.01 to about 10% by weight of nonvolatile surfactant which is a nonionic surfactant, anionic surfactant or mixture thereof, (c) from 0 to about 65% by weight of at least one nonvolatile curing polyol, (d) from 0 to about 25% by weight of at least one organic solvent free of isocyanate reactive groups, and (e) from about 15 to about 99.64% by weight of water.

* * * * *